United States Patent
Sasson et al.

(10) Patent No.: US 7,305,024 B2
(45) Date of Patent: Dec. 4, 2007

(54) METHOD OF FIXING FREQUENCY COMPLEX UP-CONVERSION PHASE AND GAIN IMPAIRMENTS

(75) Inventors: Nir Sasson, Ein-Sarid (IL); Uri Garbi, Rosh Haain (IL); Alon Elhanati, Tel Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 762 days.

(21) Appl. No.: 10/652,674

(22) Filed: Aug. 29, 2003

(65) Prior Publication Data

US 2005/0047494 A1 Mar. 3, 2005

(51) Int. Cl.
*H04B 1/38* (2006.01)

(52) U.S. Cl. ...................... 375/219; 375/259

(58) Field of Classification Search ............... 375/219
See application file for complete search history.

(56) References Cited

U.S. PATENT DOCUMENTS 5,444,864 A * 8/1995 Smith ..................... 455/84

2004/0151237 A1* 8/2004 Ferry et al. ............... 375/219
2004/0202236 A1* 10/2004 Kv Kumar ................ 375/219
2004/0203472 A1* 10/2004 Chien ....................... 455/68
2004/0266360 A1* 12/2004 Hamalainen et al. ..... 455/67.16

FOREIGN PATENT DOCUMENTS

EP          1298791 A1 *  4/2003
WO       WO 0225846 A  *  3/2002

* cited by examiner

*Primary Examiner*—Mohammed Ghayour
*Assistant Examiner*—Juan Alberto Torres
(74) *Attorney, Agent, or Firm*—Steven A. Shaw; W. James Brady; Frederick J. Telecky, Jr.

(57) ABSTRACT

A technique associated with transceiver systems solves transmitter impairments when the system has both receiver and transmitter operating with the same local oscillator frequency but with independent phase and gain impairments.

13 Claims, 2 Drawing Sheets

METHOD OF FIXING FREQUENCY COMPLEX UP-CONVERSION PHASE AND GAIN IMPAIRMENTS

BACKGROUND OF THE INVENTION

1. Field of the Invention

This invention relates generally to transceiver systems and methods, and more particularly to a technique for solving transmitter impairments when a system has both receiver and transmitter operating with the same local oscillator frequency but with independent phase and gain impairments.

2. Description of the Prior Art

Schemes utilizing the complex conversion (down conversion or up conversion) use two local oscillators (shifted by 90 degrees) and two mixers to form two orthogonal output signals in down conversion. One is referred to as Real and the other as Imaginary. In the up conversion case the complex baseband signal is up converted to a real signal in IF. Implementing this scheme using analog components (phase shifter and mixer) causes phase, gain and delay mismatches. The delay mismatch can be regarded as phase mismatch as long as the signal bandwidth is relatively small with respect to its center frequency.

Some systems include both a transmitter and a receiver operating in conjunction with the respective local oscillators and having the same frequency but with independent phase and gain errors. Such system exist for example in the case of Wireless Local Area Network WLAN Institute of Electrical and Electronics Engineers (IEEE 802.11), where possible implementation includes a complex up converter and a complex down converter, both having the same local oscillator frequency. This approach, being low cost and simple, is widely used in many applications such as the Wireless Local Area Network WLAN. Each of the converters needs the phase and gain mismatch to be corrected in case of limited analog performance of the converters. Each one must be optimized independently, as transmitter and receiver specifications are set separately due to interoperability requirements between different vendors.

In view of the foregoing, a need exists for a technique to solve transmitter impairments when a system has both receiver and transmitter operating with the same local oscillator frequency but with independent phase and gain impairments.

SUMMARY OF THE INVENTION

The present invention is directed to a technique for solving transmitter impairments associated with a transceiver system when the system has both receiver and transmitter operating with the same local oscillator frequency but with independent phase and gain impairments.

According to one embodiment, a method of repairing frequency complex up-conversion phase and gain impairments in a up/down conversion transceiver comprises the steps of:

estimating gain and phase imbalance parameters in receive mode during transceiver power-up;

canceling the receive mode gain and phase imbalance in response to the estimated parameters;

switching the transceiver to transmit mode subsequent to cancellation of the receiver gain and phase imbalance;

transmitting a signal back into the receiver via the transceiver transmitter subsequent to switching to the transmit mode;

re-estimating gain and phase imbalance parameters subsequent to transmission of the signal back into the receiver, and generating transmit mode gain and phase impairments there from; and canceling transmit mode gain and phase imbalance in response to the estimated impairments.

According to another embodiment, an up/down conversion transceiver comprises:

an analog down converter operational in association with a plurality of A/D converters to generate in-phase signals and quadrature signals in response to passband RF input signals;

a digital gain equalizer operational in response to the in-phase and quadrature signals to cancel a estimated receive gain error when the transceiver is in receive mode and further operational to estimate a transmit gain error when the transceiver is in transmit mode;

a digital phase estimator operational in response to the in-phase and quadrature signals to generate a estimated receive phase error when the transceiver is in receive mode and further operational to estimate a transmit phase error when the transceiver is in transmit mode;

a receiver digital phase equalizer operational to cancel the estimated receive phase error; and a transmitter operational to generate up-converted passband RF input signals having canceled transmit gain and phase imbalances in response to the passband RF input signal, the estimated transmit gain error and the transmit phase error.

According to yet another embodiment, an up/down conversion transceiver comprises:

a receiver operating at a local oscillator frequency; and a transmitter operating at the local oscillator frequency, wherein the receiver and transmitter, independently of one another, are each configured to cancel its respective gain and phase impairments.

According to still another embodiment, an up/down conversion transceiver comprises:

a receiver operating at a local oscillator frequency;

a transmitter operating at the local oscillator frequency; and algorithmic software, wherein the receiver and transmitter operate independently of one another in response to the algorithmic software such that the receiver and transmitter each cancel only its respective gain and phase imbalances.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawing figures thereof and wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
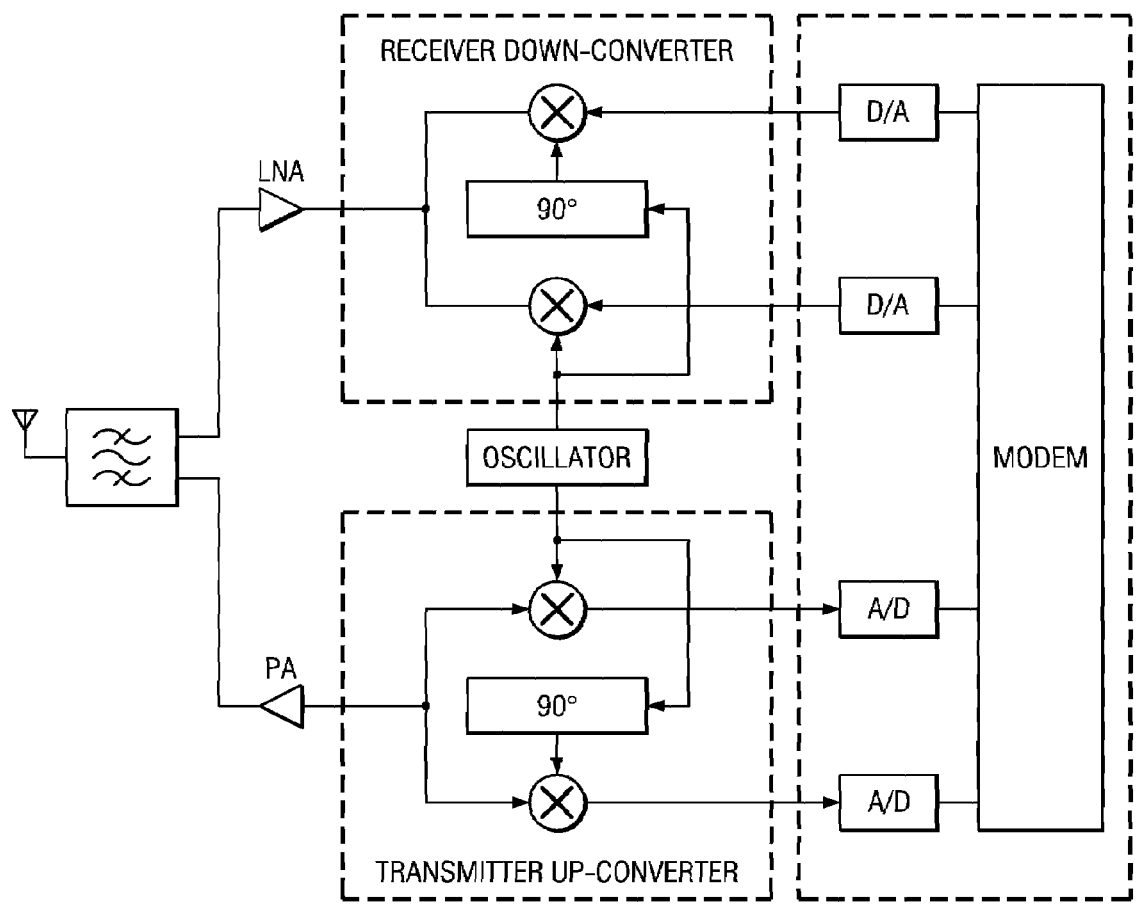
FIG. 1 is a system level diagram illustrating a general up/down conversion transceiver for wireless applications that is known in the art.

FIG. 1 is a system level diagram illustrating a general up/down conversion transceiver 10 for wireless applications that is known in the art.

Assuming a received signal is of the form:

$$S(t)=S_i(t)\cos(\omega_0 t)-S_q(t)\sin(\omega_0 t)$$

And two local oscillators, then $$L_{01}(t)=\cos(\omega_0 t+\theta/2) \text{ and}$$

$$L_{02}(t)=\sin(\omega_0 t-\theta/2)$$

where, $\theta<<1$ is the phase error and let A be the ratio of the gain of the path of q to the path of i ($A\approx 1$).

The resulting signals after down-conversion (assuming low-pass filters after the mixers) are:

$$i(t)=S(t)\cos(\omega_0 t+\theta/2)\approx S(t)\cos(\omega_0 t)-S(t)\sin(\omega_0 t)\theta/2; \text{ and}$$

$$q(t)=S(t)A\sin(\omega_0 t-\theta/2)\approx S(t)A\sin(\omega_0 t)-S(t)A\cos(\omega_0 t)\theta/2$$

The resulting signal after up-conversion is:

$$S(t)=S_i(t)\cos(\omega_1 t+\Delta/2)-S_q(t)B\sin(\omega_1 t+\Delta/2)=S_i(t)\cos(\omega_1 t)\cos(\Delta/2)-S_i(t)\sin(\omega_1 t)\sin(\Delta/2)-\{S_q(t)B\sin(\omega_1 t)\cos(\Delta/2)-s_q(t)B\cos(\omega_1 t)\sin(\Delta/2)\}$$

where, $S_i(t)$ and $S_q(t)$ are the real and imaginary components of the complex signal that is up converted and $\Delta<<1$ and $B\approx 1$ are the phase and gain imbalance (ratio of the q and the i path's gains) of the unconverted paths. $\omega_1$ is the up-converted center frequency, which is the local oscillators' frequency. Under these assumptions, $$S(t)\approx\{S_i(t)+BS_q(t)\Delta/2\}\cos(\omega_1 t)-\{S_i(t)\Delta/2+BS_q(t)\}\sin(\omega_1 t)$$

Inserting this into a complex down conversion with the phase and gain imbalance as described above yields, $$i(t)\approx S(t)\cos(\omega_0 t)-S(t)\sin(\omega_0 t)\theta/2=\lfloor\{S_i(t)+BS_q(t)\Delta/2\}\cos(\omega_1 t)-\{S_i(t)\Delta/2+BS_q(t)\}\sin(\omega_1 t)\rfloor\cos(\omega_0 t)-\lfloor\{S_i(t)+BS_q(t)\Delta/2\}\cos(\omega_1 t)-\{S_i(t)\Delta/2+BS_q(t)\}\sin(\omega_1 t)\rfloor\sin(\omega_0 t)\theta/2$$

and $$q(t)\approx S(t)A\sin(\omega_0 t)-S(t)A\cos(\omega_0 t)\theta/2=\lfloor\{S_i(t)+BS_q(t)\Delta/2\}\cos(\omega_1 t)-\{S_i(t)\Delta/2+BS_q(t)\}\sin(\omega_1 t)\rfloor A\sin(\omega_0 t)-\lfloor\{S_i(t)+BS_q(t)\Delta/2\}\cos(\omega_1 t)-\{S_i(t)\Delta/2+BS_q(t)\}\sin(\omega_1 t)\rfloor A\cos(\omega_0 t)\theta/2$$

The analysis herein below applies for a case where the up conversion and the down conversion are implemented with the same local oscillator frequency, meaning $\omega_1=\omega_0$, but the phase imbalances $\theta$, $\Delta$ are independent. For this analysis it is also assumed $\omega_{1,0}$ are larger significantly than the signal bandwidth; therefore any terms around $\omega_1$ or $2\omega_1$ are filtered with a low pass filter in the baseband. In this case, $$\cos^2(\omega_1 t)|_{BB}=\tfrac{1}{2},$$

$$\sin^2(\omega_1 t)|_{BB}=\tfrac{1}{2}, \text{ and}$$

$$\sin(\omega_1 t)\sin(\omega_1 t)|_{BB}=0$$

Therefore, $$i(t)\approx\lfloor\{S_i(t)+BS_q(t)\Delta/2\}\cos(\omega_1 t)-\{S_i(t)\Delta/2+BS_q(t)\}\sin(\omega_1 t)\rfloor\cos(\omega_0 t)-\lfloor\{S_i(t)+BS_q(t)\Delta/2\}\cos(\omega_1 t)-\{S_i(t)\Delta/2+BS_q(t)\}\sin(\omega_1 t)\rfloor\sin(\omega_0 t)\theta/2=\tfrac{1}{2}\{S_i(t)+BS_q(t)\Delta/2\}+\tfrac{1}{2}\{S_i(t)\Delta/2+BS_q(t)\}\cdot\theta/2$$

$$q(t)\approx\lfloor\{S_i(t)+BS_q(t)\Delta/2\}\cos(\omega_1 t)-\{S_i(t)\Delta/2+BS_q(t)\}\sin(\omega_1 t)\rfloor A\sin(\omega_0 t)-\lfloor\{S_i(t)+BS_q(t)\Delta/2\}\cos(\omega_1 t)-\{S_i(t)\Delta/2+BS_q(t)\}\sin(\omega_1 t)\rfloor A\cos(\omega_0 t)\theta/2=-\tfrac{1}{2}\{S_i(t)\Delta/2+BS_q(t)\}A-\tfrac{1}{2}\{S_i(t)+BS_q(t)\Delta/2\}A\cdot\theta/2$$

The present inventors have discovered the phase and gain imbalance of the down-conversion can be addressed and canceled independently of the up-conversion impairment with external signal or noise. Therefore, in this analysis one can assume that $A\approx 1$ and $\theta\approx 0$ after the correction algorithms. This yields, $$i(t)\approx\tfrac{1}{2}\{S_i(t)+BS_q(t)\Delta/2\}, \text{ and}$$

$$q(t)\approx-\tfrac{1}{2}\{S_i(t)\Delta/2+BS_q(t)\}.$$

As $S_i(t)$ and $S_q(t)$ are independent, cross-correlating the two products (with zero delay) yields:

$$R_{iq}(0)=E\{i(t)q(t)\}\approx-\tfrac{1}{8}\{S_i^2(t)+B^2 S_q^2(t)\}\Delta.$$

Assuming again that the phase and gain imbalance are small, their estimation can be done as if decoupled; and the second order effect is negligible. Therefore, the phase imbalance estimate $\Delta_{est}$ is:

$$\Delta_{est}\approx-8R_{iq}(0)/\{S_i^2(t)+B_{est}^2 S_q^2(t)\};$$

and the gain imbalance estimate $B_{est}$ is the empirical ratio in the receiver, since $$S_i(t)\approx 2i(t)-BS_q(t)\Delta/2,$$

$$BS_q(t)\approx-2q(t)-S_i(t)\Delta/2$$

and $\Delta$ is small enough to neglect its impact. We get, $$B_{est}=BS_q(t)/S_i(t)=\{-2q(t)-S_i(t)\Delta/2\}/\{2i(t)-BS_q(t)\Delta/2\}\approx-q(t)/i(t)$$

Finally, we apply the gain and phase imbalance estimates to correct the transmitter up-converter impairments, and use modified real and imaginary inputs $S_{jmod}(t)$ and $S_{qmod}(t)$:

$$S_{jmod}(t)=S_i(t)-S_q(t)\Delta_{est}/2$$

$$S_{qmod}(t)=S_q(t)/B_{est}-S_i(t)\Delta_{est}/2B_{est}$$

Thus, $$S(t)=\{\lfloor S_i(t)-S_q(t)\Delta/2\rfloor+B\lfloor S_q(t)/B-S_i(t)\Delta/2B\rfloor\Delta/2\}\cos(\omega_1 t)-S(t)=\{\lfloor S_i(t)-S_q(t)\Delta/2\rfloor\Delta/2+B\lfloor S_q(t)/B-S_i(t)\Delta/2B\rfloor\}\cos(\omega_1 t)=\{S_i(t)-S_i(t)\Delta^2/4\}\cos(\omega_1 t)-\{S_q(t)-S_q(t)\Delta^2/4\}\sin(\omega_1 t)$$

And finally with error in the order of $\Delta^2$, we get $$S(t)\approx S_i(t)\cos(\omega_1 t)-S_i(t)\sin(\omega_1 t).$$

It is important to notice that the phase imbalance estimate algorithm of the up-converter and down-converter are the same; and measurements are done always in the receiver. This implies that the same hardware (HW) can be used for both, while in the case of the receiver impairments, the estimates of the phase and gain imbalance are used to correct forward the demodulated signals samples, while in the case of the transmitter, the estimates of the same mechanism in the receiver are fed back to the transmitter in order to correct the transmitted symbols.

Figure 2:
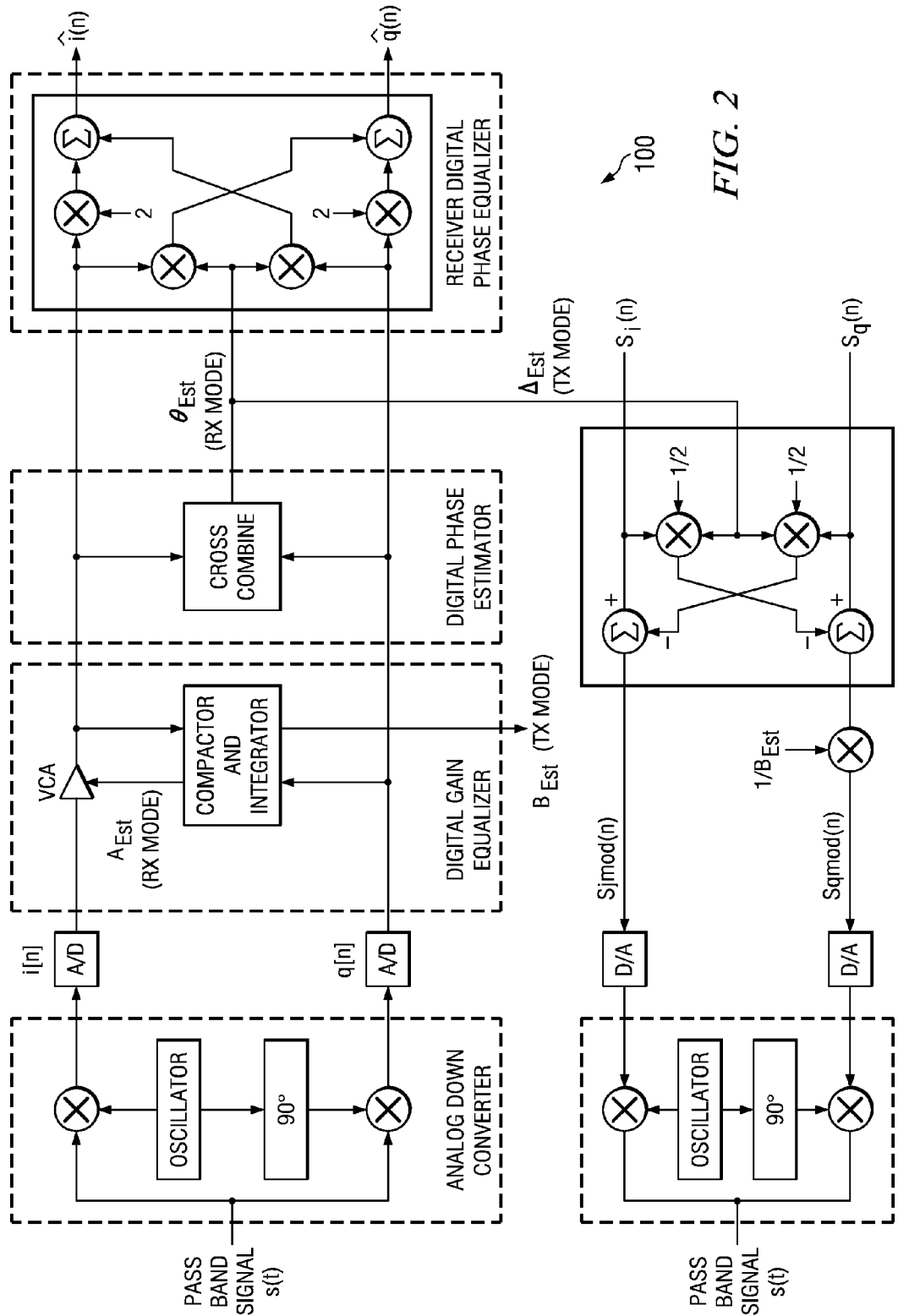
FIG. 2 is a block diagram illustrating a receiver/transmitter according to one embodiment of the present invention.

FIG. 2 is a block diagram illustrating a receiver/transmitter 100 for implementing the foregoing algorithm according to one embodiment of the present invention. The algorithm is applied in the simple way described as follows:

1. During power up, the receiver gain and phase imbalance is canceled based on estimation of these parameters using either amplified noise or an external signal. Phase and gain impairments in the receiver are corrected in a feed forward method as stated herein before.
2. Once the receiver impairments are canceled, the system 100 is switched to transmission mode. A signal is transmitted and fed back to the receiver through coupling back close to a duplexer or switch (depending on RF implementation). The transmission to the antenna is blocked and prevented at that point. The estimation of the phase and gain imbalance is done once more with same hardware in the receiver. With the receiver impairments canceled digitally, we are left with the transmission impairments only. The phase and gain impairments estimation is fed back to the transmitter, changing as a result the transmitted symbols as described herein above.
3. After power up, the changes are expected due to temperature variations etc. In this case, a periodic cancellation is done in the same manner described above in steps 1-2. The receiver impairments are estimated using the received signal (instead of just noise as before). The transmission impairments update are implemented while a signal is transmitted or in between a signal's transmission with a test signal. In the latter case, blocking of the signal from going to the antenna is mandatory.

The present inventors discovered the algorithm described herein above to have many significant benefits and characteristics:

1. The signal-processing algorithm, for example, is basically blind meaning that it does not require any information on the passband signal characteristics;
2. The up conversion and down conversion phase and gain mismatch corrections are not fully decoupled but can be separated due to non-overlapping processes. The down conversion mismatch corrections therefore, can start operating in power up independent of the transmitter corrections. Once these mismatches are fixed, the transmitter's up conversion mismatches can be fixed by transmitting a signal and coupling it back to the receiver, while blocking the transmission to antenna. In the receiver, the mismatches are estimated and feedback to the transmitter for optimization; and
3. The hardware to implement the down conversion and the up conversion's phase and gain mismatches is almost identical. In fact, for the down conversion receiver, the estimation of the phase and gain can be fed forward for correction in the receiver. In the transmitter case, the phase and gain estimation coupled back to the receiver are fed back to the transmitter for the correction of the transmitter signal.

In view of the above, it can be seen the present invention presents a significant advancement in the art of wireless transceiver applications. It should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A blind method of compensation in a digital domain for frequency complex up-conversion phase and gain impairments in an up/down conversion transceiver, the method comprising:
   estimating gain and phase imbalance parameters in receive mode during transceiver power-up;
   digitally canceling the receive mode gain and phase imbalance in response to the estimated parameters;
   switching the transceiver to transmit mode subsequent to cancellation of the receiver gain and phase imbalance;
   transmitting a useful signal back into the receiver via the transceiver transmitter subsequent to switching to the transmit mode;
   blindly re-estimating gain and phase imbalance parameters subsequent to transmission of the useful signal back into the receiver, and generating transmit mode gain and phase impairments there from; and
   digitally canceling transmit mode gain and phase imbalance in response to the estimated impairments.

2. The method according to claim 1, wherein the receive mode gain and phase parameters are selectively estimated in response to amplified noise or an external test signal.

3. The method according to claim 1, wherein the receive mode gain and phase parameters are selectively estimated in response to a received passband input signal.

4. The method according to claim 1, wherein the receive mode gain and phase imbalance is digitally canceled in a feed forward manner.

5. A up/down conversion transceiver comprising:
   an analog down converter operational in association with a plurality of A/D converters to generate in-phase signals and quadrature signals in response to actual passband RF input signals;
   a digital gain equalizer operational in response to the actual in-phase and quadrature signals to cancel a blindly re-estimated receive gain error when the transceiver is in receive mode and further operational to estimate a transmit gain error when the transceiver is in transmit mode;
   a digital phase estimator operational in response to the actual in-phase and quadrature signals to generate a blindly re-estimated receive phase error when the transceiver is in receive mode and further operational to estimate a transmit phase error when the transceiver is in transmit mode;
   a receiver digital phase equalizer operational to cancel the estimated receive phase error; and
   a transmitter operational to generate up-converted actual passband RF input signals having canceled transmit gain and phase imbalances in response to the actual passband RF input signal, the estimated transmit gain error and the transmit phase error.

6. The up/down conversion transceiver according to claim 5, wherein receive and transmit portions of the transceiver are configured to operate with the same local oscillator frequency and are further configured to operate with independent phase and gain impairments.

7. A up/down conversion transceiver, comprising:
   a receiver operating at a local oscillator frequency, comprising:
      an analog down converter operational in association with a plurality of A/D converters to generate in-phase signals and quadrature signals in response to passband RF input signals;
      a digital gain equalizer operational in response to the in-phase and quadrature signals to cancel a estimated receive gain error when the transceiver is in receive mode and further operational to estimate a transmit gain error when the transceiver is in transmit mode;

a digital phase estimator operational in response to the in-phase and quadrature signals to generate a estimated receive phase error when the transceiver is in receive mode and further operational to estimate a transmit phase error when the transceiver is in transmit mode;

a receiver digital phase equalizer operational to cancel the estimated receive phase; and a transmitter operating at the local oscillator frequency, wherein the receiver and transmitter, independently of one another, are each configured to digitally blindly cancel its respective gain and phase impairments.

8. The up/down conversion transceiver according to claim 7, wherein the transmitter is operational to generate up-converted passband RF input signals having canceled transmit gain and phase imbalances in response to the passband RF input signal, the estimated transmit gain error and the transmit phase error.

9. The up/down conversion transceiver according to claim 7, wherein the receiver comprises:

means for generating in-phase signals and quadrature signals in response to passband RF input signals;

means responsive to the in-phase and quadrature signals for digitally canceling a estimated receive gain error when the transceiver is in receive mode and for estimating a transmit gain error when the transceiver is in transmit mode;

means responsive to the in-phase and quadrature signals for generating a estimated receive phase error when the transceiver is in receive mode and for estimating a transmit phase error when the transceiver is in transmit mode; and means for digitally canceling the estimated receive phase error.

10. The up/down conversion transceiver according to claim 9, wherein the means for generating in-phase signals and quadrature signals comprises an analog down converter operational in association with a plurality of A/D converters.

11. The up/down conversion transceiver according to claim 10, wherein the means responsive to the in-phase and quadrature signals for canceling an estimated receive gain error comprises a digital gain equalizer.

12. The up/down conversion transceiver according to claim 11, wherein the means responsive to the in-phase and quadrature signals to generate an estimated receive phase error comprises a digital phase estimator.

13. The up/down conversion transceiver according to claim 12, wherein the means for digitally canceling the estimated receive phase error comprises a receiver digital phase equalizer.

* * * * *